United States Patent

Thomas

Patent Number: 6,085,404
Date of Patent: Jul. 11, 2000

[54] METHOD OF MAKING A METALLIC FISHING LURE WITH AN INTERNAL LEAD CORE WEIGHT

[76] Inventor: Richard R. Thomas, 2000 Camanche Rd. #226, Ione, Calif. 95640

[21] Appl. No.: 09/258,912

[22] Filed: Mar. 1, 1999

[51] Int. Cl.[7] ..................................... B23P 11/00
[52] U.S. Cl. .......................... 29/517; 43/42.39; 43/42.53
[58] Field of Search ................... 43/42.53, 42.5, 43/42.39; 29/515, 516, 517, 9

[56] References Cited

U.S. PATENT DOCUMENTS

| | | | |
|---|---|---|---|
| 3,264,775 | 8/1966 | Nahigan | 43/42.39 |
| 3,919,802 | 11/1975 | Davis | 43/42.53 |
| 4,199,888 | 4/1980 | Barnes | |
| 4,785,572 | 11/1988 | Crumley | |
| 5,396,728 | 3/1995 | Weber | |
| 5,502,917 | 4/1996 | Weber | |

Primary Examiner—S. Thomas Hughes
Assistant Examiner—Anthony L. Green

[57] ABSTRACT

A method of making a small metallic fishing lure with an encapsulated lead core weight is disclosed comprising the steps of inserting a piece of lead wire into a precut piece of tubing and then pressing said tubing flat, trimming or shaping it, punching holes and attaching a hook and snap ring thereto.

2 Claims, 1 Drawing Sheet

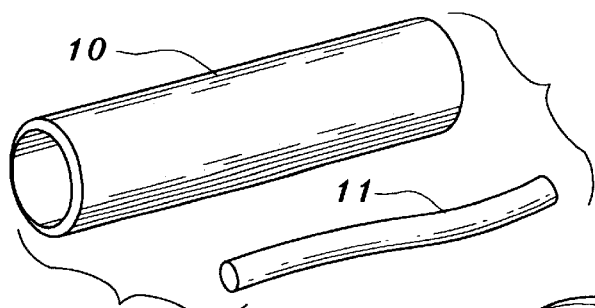
Fig. 1
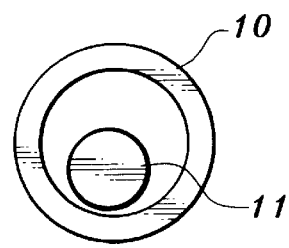
Fig. 2
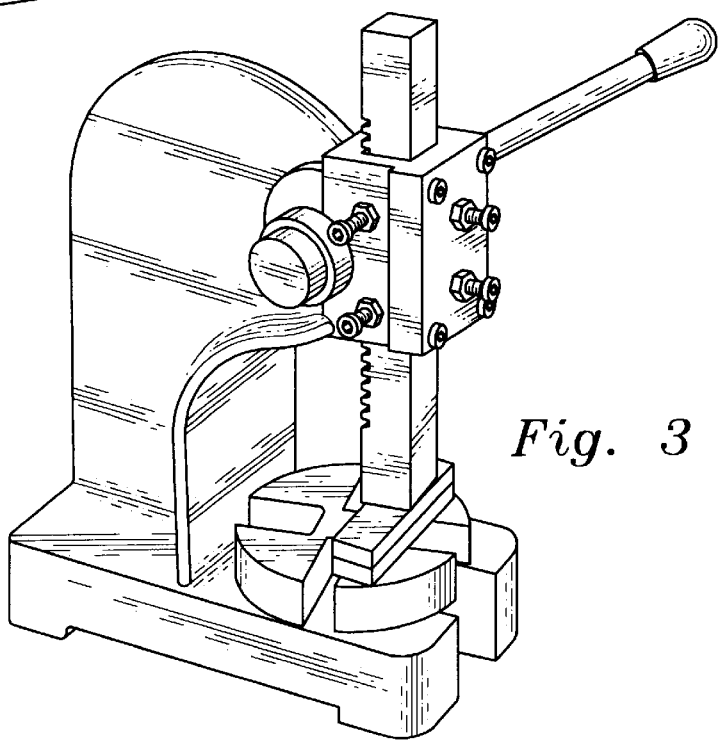
Fig. 3
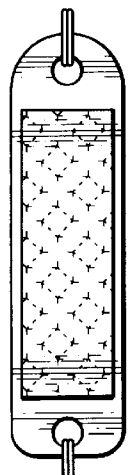
Fig. 6
Fig. 4
Fig. 5

METHOD OF MAKING A METALLIC FISHING LURE WITH AN INTERNAL LEAD CORE WEIGHT

BACKGROUND OF THE INVENTION

1. Field of the Invention

The present invention relates to fishing lures and more specifically to weighted metallic fishing lures which are pulled through the water causing fish to strike them.

More particularly the present invention pertains to a method of making a relatively small metallic fishing lure with an encapsulated internal lead core resulting in said lure having nearly twice the weight as other comparably sized metallic lures and thereby allowing the weighted lure to be cast further out into the water from a boat or shoreline without the need to add familiar lead sinkers to a fishing line.

2. Discussion of the Prior Art

There are several types of fishing lures known in the prior art as discussed in detail by Weber in his U.S. Pat. No. 5,502,917 who describes a jig-type lure; a metal spoon-type lure; and the full-bodied lure of his invention which may be distinguished from the present invention by the type of lure and method of its manufacture.

In Weber's method, the lure components are assembled, placed in a body mold and then injected with plastic material to form the body over its internal components. It appears that injection molding is used as a common method of manufacturing most full-bodied lures, such as those described in U.S. Pat. Nos. 5,396,728 and 4,785,572, although those patents among many others do not specifically claim a method of their manufacturer. They merely claim their mechanical features such as appearance, structure and behavior in the water.

In contrast to full-bodied lures, the lure of the present invention does not require the use of expensive injection molding to encapsulate assembled internal component parts and it does not claim to possess any unique external appearance, structure or behavior in the water. Its major patentable feature is believed to be its density resulting from a unique method by which it is made.

A second type of lure discussed by Weber in his U.S. Pat. No. 5,502,917, is a jig-type lure which Weber states its most basic form simply consists of a lead weight molded onto the shank of a hook adjacent to the eye of the hook.

However, a typical example of a modern jig-type lure largely used by commercial fishermen today is disclosed by Barnes in U.S. Pat. No. 4,199,888, wherein Barnes describes an elongated lead body 5 to 6 inches long and about 1 inch wide and weighs about 1 pound. This jig-type lure is particularly well suited to bring up from very deep ocean depths very large fish due to the strength of the lure which is attained by a wire embedded along the internal length of the lead body during the molding process and has an eyelet at one end for connecting to a fishing line and a hook at the other end.

Although the Barnes' "888" patent neither claims nor discloses a method by which his lure is made, he does disclose numerous different patterns of reflecting tape which may be attached to the peripheral surface of the lure's lead body for a purpose of attracting fish by light diffraction when his jig is raised up and down vertically.

In contrast, the lure of the present invention may be classified according to Weber in his "917" patent as a metal spoon-type lure of which many shapes and sizes are used today. Nearly all of these are stamped out of sheet metal and some are painted with various designs, however the problem with all of the currently known metal spoon-type lures is that their weight is limited by the density of the metal from which they are made. Therefore, it is usually necessary to use some type of sinker attached to a fishing line when using metal spoon-type lures to achieve longer casting distances or deeper fishing depth.

Accordingly, it is an object of the present invention to provide a method by which an internal lead weight core of various sizes may be encapsulated within a body portion of a metallic fishing lure to increase its weight. This object is achieved in the present invention.

SUMMARY OF THE INVENTION

In accordance with the present invention, the following steps are presented to make a metallic lure with an internal lead core weight:

1. cut a piece of steel, brass or copper tubing to a length corresponding to the length of a desired lure;
2. insert a piece of lead wire into the tubing;
3. press the tubing flat to obtain a lure body;
4. trim the ends of the lure body;
5. punch a hole at each end of the lure body;
6. shape the lure body as desired;
7. attach a hook, snap ring or swivel to the holes.

BRIEF DESCRIPTION OF THE DRAWINGS

FIG. 1 is a perspective view of a piece of metallic tubing and piece of lead wire before insertion into the tube;

FIG. 2 is an end elevational view of the tubing with lead wire inserted;

FIG. 3 is an illustration of a typical hand press used to flatten, trim, punch holes and shape the lure body;

FIG. 4 is a perspective view of the lure body after flattening the tubing with lead wire installed as shown in FIG. 2;

FIG. 5 is a perspective view of the finished lure body;

FIG. 6 is an elevational view of a typical fishing lure produced by the method of the present invention.

DETAILED DESCRIPTION OF THE PREFERRED EMBODIMENT

Before turning to the drawings, it should be said that the method presented herein is offered in its most simplified format in order for a complete disclosure which will allow anyone skilled in the art to practice the invention. It should also be understood that there are presently available in many machine shops machinery, equipment and tools which could easily automate this method by merely employing different techniques and procedures, however these variations should not defeat the spirit and scope of this present disclosure.

Now turning to the drawings, FIG. 1 is a perspective view of a piece of metallic tubing 10, preferably steel, brass or copper, along side a piece of lead wire 11 before said wire is inserted into the tube. In this illustration the tubing 10 has been cut to a length corresponding to that of a desired lure body. The tubing 10 can be obtained in twenty-foot lengths and the lead wire 11 is available in 100-foot rolls, however choosing the proper diameter size of the tubing and lead wire will depend of the desired size and weight of the lure.

Turning now to FIG. 2, an end elevational view of the tubing 10 with lead wire 11 inserted, it can be easily seen that said wire comprises about 50% of the available crosssectional area of said tube. The reason for this is when said tubing 10 is flattened, the lead wire 11 is compressed into said free space while expelling all of the air and thereby resulting in a lure body with a density greater that can be found in any known conventional sheet metal spoon-type lure of the same size on the market today. In FIG. 3 there is illustrated a typical hand operated press used for flattening, punching holes and shaping a lure body by use of dies which may be interchanged in said press to perform each operation.

However, as it was previously stated, this preferred embodiment only presents a most simplified method for making the invention one at a time by hand, and it is within the scope and spirit of this disclosure that two or more presses could be equipped with appropriate dies or that an automated process could be used whereby an automatic press with an appropriate number of dies in tandem would be able to mass produce these lure bodies as longer lengths of tubing pre-fitted with lead wire are linearly fed through the press.

The "Arbor" press illustrated in FIG. 3 is used with a set of common dies for each operation. For example for flattening there is a flattening die; for cutting or trimming there is a cutting die; for punching holes there is a punch die, and for shaping there is a shaping die. Some functions of these dies may be combined as is well known by those skilled in the art, such as the cutting and punching operation may be combined by one set of dies in one operation. Moreover, the shaping die may or may not be employed as it is used in this method to provide a desired curvature within a longitudinal plane of said lure body for enhancing its performance.

FIG. 4 is a perspective view of a lure body 12 after flattening its tubing 10 with its installed lead wire 11 by a hand press such as the one illustrated in FIG. 3 utilizing a set of flattening dies. It can be easily seen that the lure body 12 is a rectangle with minimal thickness 13 as compared with its length and width.

Trimming is done once again with a hand press utilizing a set of cutting dies which may be custom made to impart any desired shape to each end of said lure body 12, but in this preferred embodiment the front of said lure has been given a semi-circular shape while the rear remains straight. In this particular method the trimming die has been preferably combined with a punching die so that holes at each end of the lure body 12 have been made while trimming it in one operation.

FIG. 5 is a perspective view of the completed lure body 12 with the holes 14 provided therein as mentioned above. It may be seen that in this particular embodiment the completed lure body 12 has a slight "S" curvature within the plane of its wide longitudinal axis. But as it was earlier mentioned the final shape, contour, form or pattern is merely a mechanical aspect of any lure having nothing to do with a method of manufacturing it and especially for an encapsulation of a lead weight therein. It may be very well indeed that new configurations of shape may prove to be more desirable in the future. However, at this point and time the final shape of said lure body 12 as illustrated in FIG. 5 is a part of this disclosure because it has been found very effective in catching fish.

And finally, FIG. 6 is an elevational view of a typical fishing lure utilizing the lure body 12 made by the method of the present invention. It has been said in the introduction that most of the fishing lures described in the prior art do not claim nor disclose their methods of manufacture but their mechanical features for catching fish. The disclosure of the present invention claims only a new way to make a lure, and its effectiveness shall be left to the veracity of those who use it. Having my invention in detail,

I claim:

1. A method of making a metallic fishing lure with an internal lead core weight, the method comprising the steps of:

cutting a piece of steel, brass or copper tubing to a length corresponding to a length of a desired lure body;

inserting a piece of lead wire into the tubing;

pressing the tubing flat to obtain a lure body;

trimming or shaping the lure body;

punching holes at each end of the lure body;

attaching a hook, snap ring or swivel to the holes.

2. The method of claim 1 wherein said method is automated.

* * * * *